Figure 1:
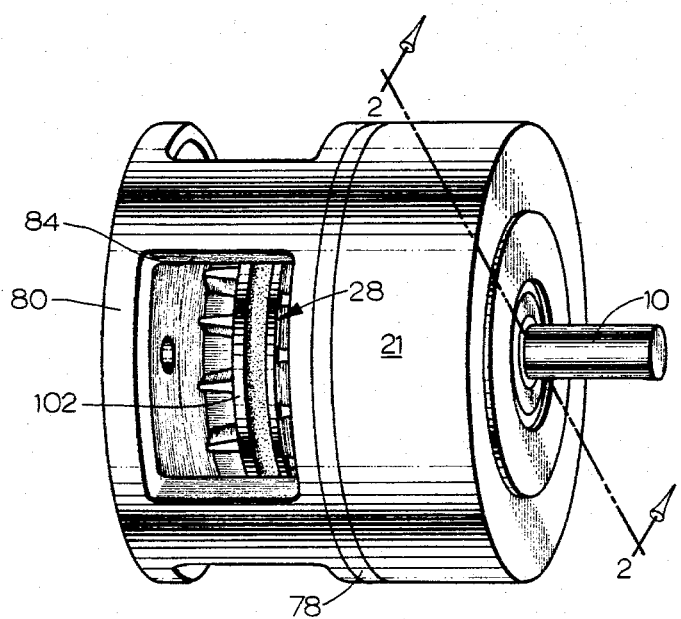

United States Patent [19]

Brooks

[11] Patent Number: 4,534,454
[45] Date of Patent: Aug. 13, 1985

[54] COMBINATION CLUTCH-BRAKE

[75] Inventor: Edward D. Brooks, Fridley, Minn.

[73] Assignee: Horton Manufacturing Co., Inc., Minneapolis, Minn.

[21] Appl. No.: 325,857

[22] Filed: Nov. 30, 1981

[51] Int. Cl.³ .............................................. B60K 41/24
[52] U.S. Cl. .................................................. 192/18 A
[58] Field of Search ............... 192/18 A, 85 A, 113 A, 192/17 A, 12 C, 18 B, 18 R

[56] References Cited

U.S. PATENT DOCUMENTS

| | | | |
|---|---|---|---|
| 2,159,326 | 5/1939 | Harwood | 192/18 |
| 2,436,968 | 3/1948 | Longfield | 192/18 |
| 3,295,394 | 1/1967 | Whateley | 192/18 A |
| 3,305,054 | 2/1967 | Liszewski et al. | 192/18 A |
| 3,378,120 | 4/1968 | Miller et al. | 192/18 A |
| 3,382,736 | 5/1968 | Abbott | 192/18 R |
| 3,638,773 | 1/1972 | Lewis et al. | 192/18 A |
| 3,667,581 | 6/1972 | Hanks | 192/18 A |
| 3,872,954 | 3/1975 | Nordstrom et al. | 192/18 A |
| 4,195,717 | 4/1980 | Williams | 192/18 A |
| 4,403,526 | 9/1983 | Numazawa et al. | 192/18 R |

Primary Examiner—George H. Krizmanich
Attorney, Agent, or Firm—Peterson, Wicks, Nemer & Kamrath

[57] ABSTRACT

A combination clutch-brake including a housing having an output shaft rotatably mounted therein. A first hub having a first friction disc with a friction lining thereon and connected thereto is slideably mounted on the output shaft and rotatable therewith. A single annular piston is slideably mounted in a cylinder formed in the housing with a bearing interposed between the annular piston and the first hub allowing the hub to rotate radially within the annular piston. An annular spring housing having an annular backing portion with a friction lining connected thereto is fixedly mounted within and carried by the housing axially with respect to the piston. The spring housing has a series of spaced springs mounted thereon in urging contact with the piston whereby the friction lining of the spring housing backing portion contacts the first friction disc for braking of the output shaft when there is no fluid pressure in the cylinder.

A second hub for connection with an input shaft and having a second friction disc thereon is rotatably mounted within the housing and engageable with a friction lining on the first friction disc when fluid pressure is introduced into the cylinder to thereby withdraw the first friction disc from the friction lining of the annular backing of the spring housing thereby debraking and clutching in the output shaft.

18 Claims, 6 Drawing Figures

COMBINATION CLUTCH-BRAKE

SUMMARY

The invention relates to an improvement in a combination clutch-brake unit. It is an object of the invention to provide a clutch-brake having a single piston urgeable in either direction for alternately engaging a clutch or a brake in a single housing. It is a further object to provide a single piston in a clutch-brake whereby the brake-engaging side is actuated by a multiplicity of springs with the clutch side actuated by fluid pressure on the opposite side of the piston.

With the use of a multiplicity of springs as above, a predetermined fixed-within-limits resistance to brake release is created. With the springs actuating the braking, the amount of fluid pressure required to release the brake can be predetermined by the size and types of springs in the construction of the brake whereby the user of the unit can be preadvised of the single fluid pressure needed to disengaged the brake and also the rate of brake release can be simply established by the rate of inflow of fluid pressure against the alternate clutch pressure side of the piston. Such can be done by one control valve of the air pressure and it allows simple set up by the user of the unit. On the other hand, with air pressure on both sides of the piston, more complicated control circuits must be used for operation.

First of all, a minimum of four way valving must be provided for even a simple operation. Furthermore, if differing torques are required for clutching and braking two separate fluid pressures, five-way valving and the associated pressure controlling apparatus must be provided.

Additionally, such conditions require that most or all of the pressure in the braking cylinder be released before the clutch can be engaged (unless the clutch-engaging pressure is substantially the greater of the two pressures). All of which causes the response time to be pressure dependent and therefore vary with the torques required and selected. Conversely, the spacings provide a constant and predetermined response rate. Briefly, with springs on one side of the piston, rate. Briefly, with springs on one side of the piston, there is no fluid exhaust release time involved in releasing the braking function.

The invention will appear more clearly from the following detailed description when taken in connection with the accompanying drawings, showing by way of example a preferred embodiment of the inventive idea wherein like numerals refer to like parts throughout.

Figure 2:
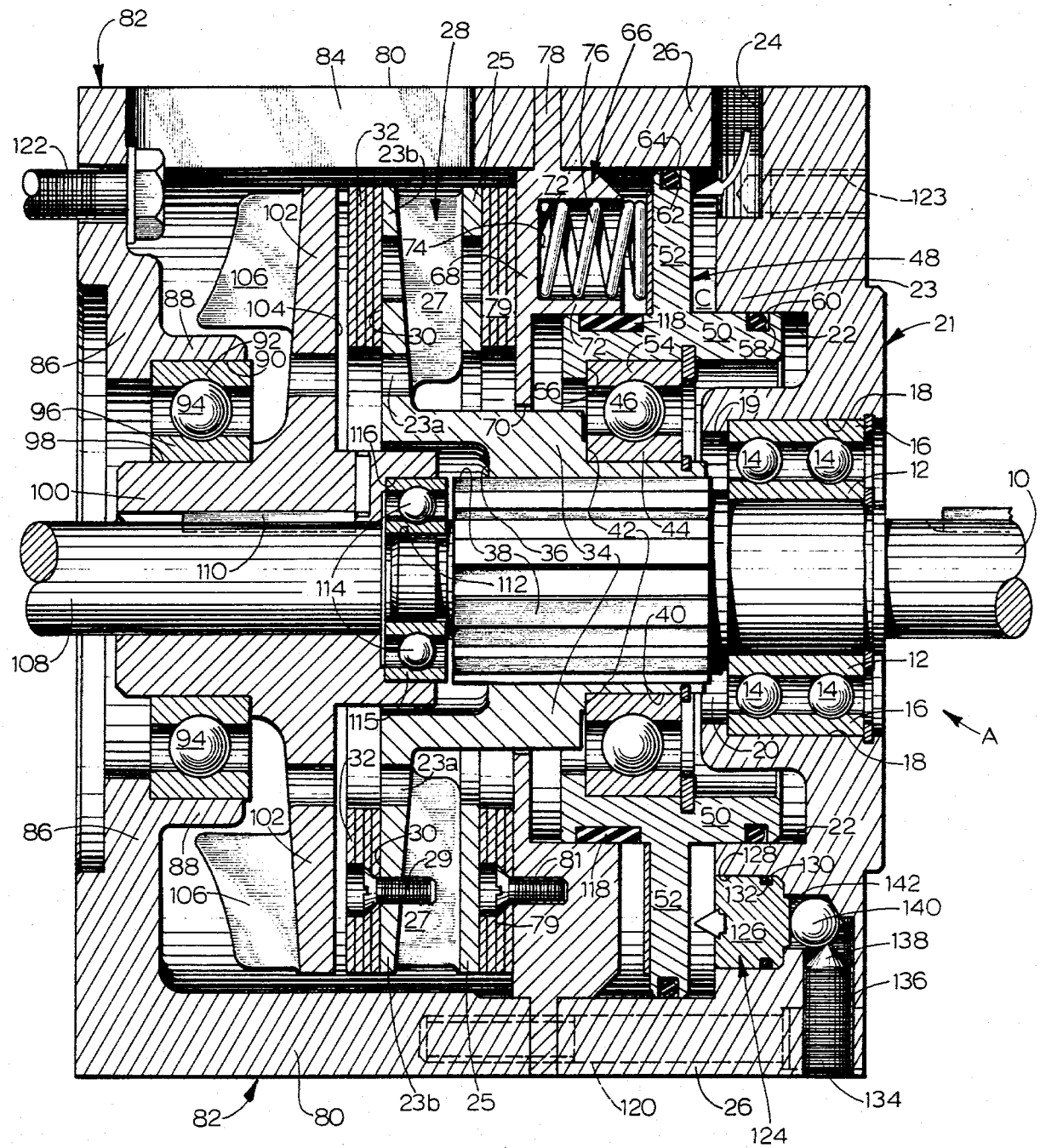
Figure 4:
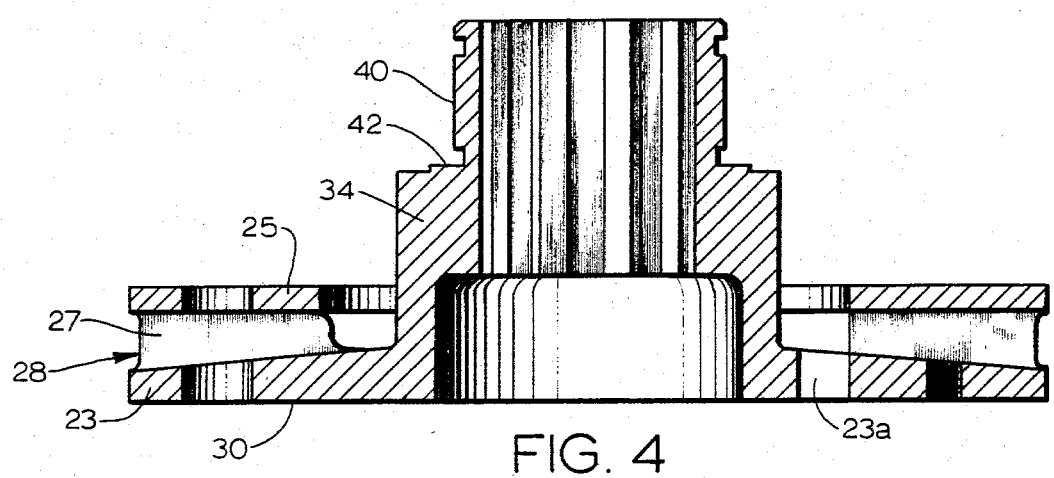
Figure 3:
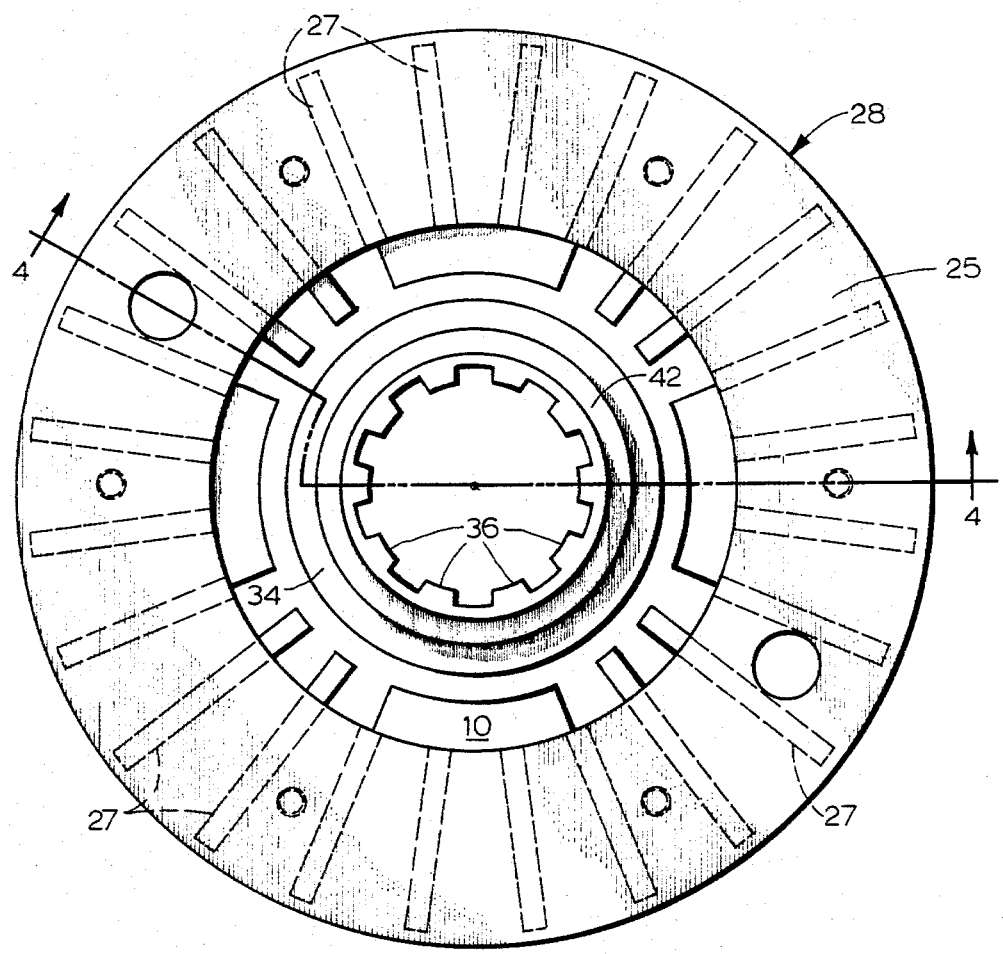
Figure 6:
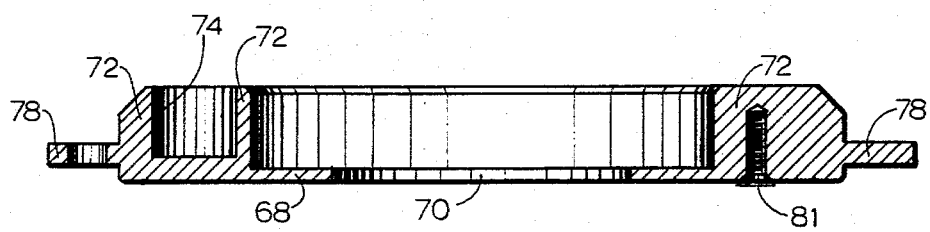
Figure 5:
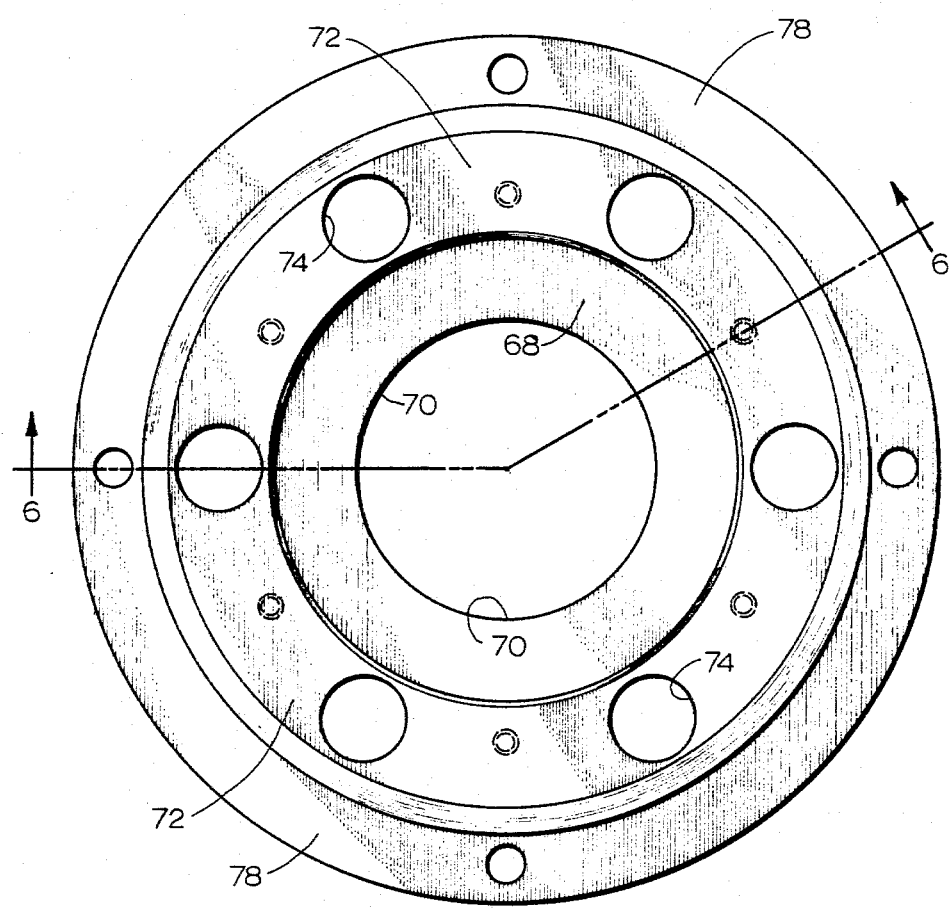

In the drawings forming part of this application:

FIG. 1. is a perspective view of a clutch-brake embodying the invention.
FIG. 2. is a sectional view of the line 2—2 of FIG. 1.
FIG. 3. is a face view of the hub disc.
FIG. 4. is a sectional view on the line 4—4 of FIG. 3.
FIG. 5. is a face view of the spring housing.
FIG. 6. is a sectional view on the line 6—6 of FIG. 5.

Referring to the drawings in detail, the clutch-brake A includes the driven rotatable output shaft 10. Mounted on the shaft 10 is the inner race 12 of the bearing 14 with the outer race 16 mounted in the circular opening 18 of the circular output stationary housing body portion 21 and against the annular shoulder 19 forming the circular opening 20. The housing body portion 21 includes annular recess 22 which forms the projection 23 and the air inlet hole 24 at the outer surface. Extending from the outer edge of the body portion 21 is the right angular annular flange 26.

Further provided is the friction disc 28 including a first flat ring portion 23b connected to a spaced second flat ring portion 25 by spaced webs 27. Flat ring portion 23b is formed with spaced cutouts 23a for heat venting. Mounted by means of bolts 29 on the face 30 of ring portion 23b is the friction lining ring 32. The disc 28 terminates radially inwardly in the hollow hub 34 formed with splines 36 slideably engaged with splines 38 of shaft 10. Formed on the hub 34 is the annular recess 40 forming the shoulder 42. Mounted in the recess 40 and against the shoulder 42 is the inner race 44 of bearing 46.

The numeral 48 designates an annular piston which includes the axially disposed annular flange portion 50 and extending radially outwardly therefrom is the annular portion 52. The outer race 54 of bearing 46 is mounted on the inner surface of the piston flange portion 50 and against the shoulder 56 thereby rotatably mounting the shaft 10 and a portion of hub 34 within the piston 48.

The annular flange portion 50 of the piston extends into the annular recess 22 of the output housing body portion 21. The annular flange portion 50 has formed on the outer surface thereof the annular groove 58 in which is positioned the O-ring 60 which makes sliding and sealing contact with the recess 22. The outer edge of the annular portion 52 of the piston 48 has formed therein the groove 62 in which is positioned the O-ring 64 which makes sliding and sealing contact with the inner surface of the right angular flange portion 26 of the output housing body portion 21.

The numeral 66 designates a spring housing which includes a circular fixed backing portion 68 with the axial opening 70 through which the hub 34 freely extends. Extending axially from the backing portion 68 is the annular body portion 72 in which is formd spaced recesses 74 each for a resilient member in one form of a coil spring 76. The body portion 72 has extending radially outwardly therefrom the annular flange 78 which abuts the inner edge of the flange 26 of the output housing 21. The flange 78 is also in abutment with the inner edge of annular flange portion 80 of input housing 82 whereby the flange 78 is tightly and immovably positioned between flange 26 and flange 80. As a result, the spring housing is fixedly mounted.

It will be seen that the piston 48, bearing 46, hub 34 and disc portion 28 thereof are all slideable on shaft 10 and all of the same are normally urged by springs 76 to the right facing in FIG. 2. It will be further seen that the void between piston annular portion 52 and housing portion 21 forms a cylinder indicated by the letter C to which there is communication by the air inlet hole 24. The piston backing portion 68 has mounted thereon the fixed friction lining ring 79 opposite ring portion 25 of friction disc 28. The lining 79 is secured by bolts 81.

The annular flange portion 80 of stationary input housing 82 has formed therethrough four openings 84 for air cooling and the flange portion 80 terminates at its outer edge in the ring like and radially disposed outer end wall 86. Extending inwardly and axially of the wall 86 is the annular flange 88 which has formed on the inner surface thereof the annular recess 90 in which is mounted the outer race 92 of bearing 94. The inner race 96 of bearing 94 is mounted in recess 98 formed on hub 100 of friction disc 102 having friction face 104. The disc 102 is equipped with the spaced cooling fins 106 and the hub 100 is keyed to the live input shaft 108 of a motor or other source of power by means of the key 110. Thus, as the shaft 108 rotates so does the disc 102.

The inner end of the shaft 10 has formed therein the recess 112 in which the inner face of the bearing 114 is mounted with the outer race 115 mounted in the recess 116 formed in the inner end of the hub 100 thereby providing support for the inner end of shaft 10 in addition to the bearing 14. The numeral 118 designates a wear sleeve mounted on the flange portion 50 of the piston 48 and upon which slideable contact is made with the inner surface of the annular body 72 of the spring housing 66.

It will be seen that with the urging movement of the piston by the springs 76 with no air pressure in the cylinder C that the ring portion 25 of the disc 28 is made to contact the lining 79 and through the hub 34 brake the shaft 10. Upon introducing fluid pressure into the cylinder C by a source (not shown) connected to inlet 24, the piston portion 52 moves upon the springs 76 and compresses and cancels out the same whereby ring portion 25 is separated from lining 79 and as a result there is no braking of the shaft 10, and the friction lining 32 contacts the face 104 of the live friction disc 102 whereby the shaft 10 is clutched in. It will be further noted that with springs on one side of the piston there is no fluid exhaust release time involved in releasing the braking.

The output housing portion 21 is connected to the input housing portion 82 by means of spaced cap screws 120. The input housing portion is provided with spaced cap screws 122 for mounting the housing to an electric motor as an example. Also, the driven and braked output shaft 10 may be connected to a gear reducer, by means of bolts secured in threaded hole 123. The shaft 10 may also be keyed to a sheave, a sprocket, a coupling or the like for actuation thereof.

The numeral 124 designates a brake manual release which includes a pair of push rods 126 each slideably mounted in a pair of spaced holes 128 formed in the output housing 21. Sealing engagement in each case is made by the O-ring 130 in the annular groove 132 in a push rod 126 which maintains sealing engagement with a hole 128. A set screw 134 is mounted in each of a threaded hole 136 and the screw has the conical point 138 which is engageable with a ball 140 mounted in a recess 142 which communicates with a hole 128 with the ball engageable with the push rod 126.

As the set screw engages the ball in a camming action, the ball transfers the movement of the set screw to the push rod so as to force the piston 48 axially to release the brake by separating the disc 28 from the friction ring 79. The brake release 124 is used to manually release the brake when there is a lack of air pressure in the cylinder C due to malfunction of the air supply or a leak in cylinder C.

Having thus described the invention, what is claimed as new and desired to be secured by Letter Patent is:

1. A combination clutch-brake comprising, in combination:
   (a) a housing,
   (b) an output shaft,
   (c) means rotatably mounting said output shaft in said housing,
   (d) a first firstion disc including a first radially extending, flat ring portion connected to a spaced second radially extending, flat ring portion in a parallel relation by spaced webs and having a first friction lining on the face of the first flat ring portion and
   (e) a first hub connected thereto,
   (f) means mounting said hub slideable on said output shaft and rotatable therewith,
   (g) a single annular piston,
   (h) means forming an annular cylinder in said housing in conjunction with said piston,
   (i) means slideably mounting said piston in said cylinder,
   (j) means mounting said piston on said first hub for axial movement therewith and for rotation of said hub and output shaft relative to said piston,
   (k) resilient means comprising a pluraity of coil springs,
   (l) said means slideably mounting said piston including means for mounting said resilient mens comprising a spring housing fixed in said housing adjacent said piston having a plurality of axially extending recesses for receiving said coil springs for normally urging said piston and said first hub in one axial direction to space said first friction lining on said first friction disc from
   (m) a driven friction disc mounted on
   (n) a second hub rotatable within said housing and to engage.
   (o) said second flat ring portion of said first friction disc with a radially extending second friction lining mounted on said means mounting said resilient means opposite to the axially extending spring recesses to thereby brake said shaft,
   (p) means for connecting an input shaft to said second hub of said driven friction disc for the driving thereof, and
   (q) means for introducing fluid pressure into said cylinder and upon said piston for movement of said first friction disc from said second lining on said means mounting said resilient means against the action of said resilient means and into engagement with said driven friction disc to thereby clutch in and rotate said output shaft; wherein the piston comprises, in combination: an axially disposed annular flange portion having a first end and a second end; an annular portion having a first end and a second, free end, with the first end of the annular portion being connected to the annular flange portion with the annular portion extending radially outward from the annular flange portion between its first and second ends; and wherein the means slideably mounting said piston includes a radially extending body portion formed in the housing having a right angular annular flange and a right angular projection, with the free end of the annular portion of the piston abutting with and for reciprocal movement on the right angular annular flange of the body portion and the axially disposed annular flange of the piston being slideable adjacent its first end on the right angular projection of the second member; and wherein the annular flange portion of the piston is slideable adjacent its second end on the spring housing.

2. The device of claim 1 in which said means rotatably mounting said output shaft in said housing includes a bearing carried by said shaft and said housing.

3. The device of claim 2 in which said means mounting said piston on said hub for axial movement therewith and for rotation of said hub and output shaft relative to said piston includes a bearing interposed between and carried by said piston and said hub.

4. The device of claim 1 in which said means mounting said piston on said hub for axial movement therewith and for rotation of said hub and output shaft relative in said piston includes a bearing interposed between and carried by said piston and said hub.

5. The device of claim 3 in which said means mounting said hub slideable on said shaft and rotatable therewith includes
   (a) splines on said hub engaged with
   (b) splines on said shaft.

6. The device of clam 1 in which said means mounting said hub slideable on said shaft and rotatable therewith includes
   (a) splines on said hub engaged with
   (b) splines on said shaft.

7. The device of claim 5 in which said means forming an annular cylinder in said housing in conjunction with said piston includes an anular projection extending internally of said housing and a right angular flange of said housing.

8. The device of claim 6 in which said means mounting said piston on said hub for axial movement therewith and rotation of said hub and output shaft relative to said piston includes a bearing interposed between said piston and said hub.

9. Apparatus for providing rotational control between a first member, a second member, and a third member comprising, in combination: means for rotatably mounting the first member, the second member, and the third member with respect to each other; a friction disc including a radially extending, flat ring portion connected to a spaced second radially extending, flat ring portion in a parallel relation by spaced webs, with a first frictional engagement surface being formed on the outside surface of the first flat ring portion and a second frictional engagement surface being formed on the outside surface of the second flat ring portion; means for slideably mounting and rotatably relating the friction disc to the first member; a piston reciprocably mounted in the second member; means for interconnecting the piston for axial movement together with the friction disc and for rotation relative to the friction disc; first friction surface means formed on the second member for frictionally engaging with the first frictional engagement surface of the friction disc; second friction surface means formed on the third member for frictionally engaging with the second frictional engagement surface of the friction disc; means for moving the piston in the second member in one axial direction for engaging the first friction surface engaging means with the first frictional engagement surface of the friction disc and for separating the second friction surface engaging means from the second frictional engagement surface of the friction disc; and means for moving the piston in the second member in the opposite axial direction for engaging the second friction surface engaging means with the second frictional surface of the friction disc and for separating the first friction surface engaging means from the first frictional engagement surface of the friction disc.

10. The apparatus of claim 9 wherein the second member is stationary and the apparatus acts as a brake when the first friction surface engaging means engages with the first frictional engagement surface of the friction disc.

11. The apparatus of claim 9 wherein the first member is an output shaft and wherein the slideably mounting and rotatably relating means comprises, in combination: a hub connected to the friction disc; and means mounting said hub slideable on said output shaft and rotatable therewith.

12. The apparatus of claim 9 wherein the piston interconnecting means includes a bearing interposed between and carried by said piston and said friction disc.

13. The apparatus of claim 9 wherein the means for moving the piston in the second member in one axial direction comprises, in combination: resilient means comprising a plurality of coil springs; and means mounting said resilient means in the second member adjacent the piston and normally urging the piston and the friction disc in the axial direction comprising a spring housing mounted to the second member having a plurality of axially extending recesses for receiving said coil springs, wherein the second member frictionally engaging means is mounted on the spring housing opposite to the axially extending spring recesses.

14. The apparatus of claim 9 wherein the means for moving the piston in the second member in the opposite axial direction comprises, in combination: a cylinder formed between the piston and the second member; and means for introducing fluid pressure into said cylinder and upon said piston for movement of the piston and the friction disc in the opposite axial direction.

15. The apparatus of claim 9 wherein the means for rotatably mounting the first member, the second member, and the third member with respect to each other comprises, in combination: means for rotatably mounting the second member on the first member; means for rotatably mounting the second member on the third member; and means for rotatably mounting the first member on the third member.

16. The apparatus of claim 9 wherein the piston comprises, in combination: an axially disposed annular flange portion having a first end and a second end; an an annular portion having a first end and a second, free end, with the first end of the annular portion being connected to the annular flange portion with the annular portion extending radially outward from the annular flange portion between its first and second ends; and wherein the second member includes a radially extending body portion having a right angular annular flange an a right angular projection, with the free end of the annular portion of the piston abutting with and for reciprocal movement on the right angular annular flange of the body portion and the axially disposed annular flange of the piston being slideable adjacent its first end on the right angular projection of the second member; and wherein the second member further includes a radially extending backing portion, with the first friction surface engaging means being located on one side of the backing portion; and with the annular flange portion of the piston being slideable adjacent its second end on the backing portion.

17. The apparatus of claim 16 wherein the first friction surface engaging means is radially arranged, wherein the backing portion further includes an annular body portion formed on the opposite side of the backing portion from the first friction surface engaging means, wit the annular flange portion of the piston being slideable adjacent its second end on the annular body portion of the backing portion; and wherein the means for moving the piston in the second member in one axial direction comprises, in combination: a plurality of coil springs; and a series of spaced, axially extending spring recesses formed in the annular body portion of the backing portion, with the springs located in the spring recesses and abutting with the radially extending annular portion of the piston.

18. The apparatus of claim 16 wherein the piston further comprises, in combination: a radially extending shoulder extending from the second end of the axially disposed annular flange portion of the piston; and wherein the means for interconnecting the piston with the friction disc includes a bearing interposed between the axially disposed annular flange portion of the piston and the friction disc slideably mounting and rotatably relating means, with the bearing abutting with the radially extending shoulder of the piston.

* * * * *

UNITED STATES PATENT OFFICE
CERTIFICATE OF CORRECTION

Patent No. 4,534,454        Dated August 13, 1985

Inventor(s) Edward D. Brooks

It is certified that error appears in the above-identified patent and that said Letters Patent are hereby corrected as shown below:

ABSTRACT, line 1, after "clutch-brake", insert --is shown--.

Column 1, line 43, cancel "with springs on one side of the piston, rate. Briefly,".

Column 4, line 18, cancel "mens" and substitute therefore --means--.

Column 5, line 6, cancel "in" and substitute therefore --to--.

Column 5, line 25, after "with and", insert --for--.

Column 5, line 33, after "including a", insert --first--.

Column 6, line 47, cancel "an" and substitute therefore --and--.

Column 6, line 64, cancel "wit" and substitute therefore --with--.

Signed and Sealed this

Seventeenth Day of December 1985

[SEAL]

Attest:

DONALD J. QUIGG

Attesting Officer      Commissioner of Patents and Trademarks